(12) United States Patent
Novoplanski et al.

(10) Patent No.: US 11,220,140 B2
(45) Date of Patent: Jan. 11, 2022

(54) PNEUMATIC TIRE WITH ANNULAR SIDEWALL CONCAVITY

(71) Applicant: GALILEO WHEEL LTD., Mevasert Zion (IL)

(72) Inventors: Avishay Novoplanski, Moshav Beit Zait (IL); Lucy Edery Azulay, Caesarea (IL)

(73) Assignee: GALILEO WHEEL LTD., Mevasert Zion (IL)

( * ) Notice: Subject to any disclaimer, the term of this patent is extended or adjusted under 35 U.S.C. 154(b) by 130 days.

(21) Appl. No.: 16/326,209

(22) PCT Filed: Sep. 25, 2017

(86) PCT No.: PCT/IL2017/051072
§ 371 (c)(1),
(2) Date: Feb. 17, 2019

(87) PCT Pub. No.: WO2018/055624
PCT Pub. Date: Mar. 29, 2018

(65) Prior Publication Data
US 2019/0275846 A1    Sep. 12, 2019

Related U.S. Application Data

(60) Provisional application No. 62/399,420, filed on Sep. 25, 2016.

(51) Int. Cl.
*B60C 13/00*    (2006.01)
*B60C 15/06*    (2006.01)
*B60C 11/03*    (2006.01)

(52) U.S. Cl.
CPC ........ *B60C 13/003* (2013.01); *B60C 15/0628* (2013.01); *B60C 2011/0313* (2013.01)

(58) Field of Classification Search
None
See application file for complete search history.

(56) References Cited

U.S. PATENT DOCUMENTS

2014/0158268 A1*    6/2014   Novoplanski ............. B60C 7/14
                                                              152/454

FOREIGN PATENT DOCUMENTS

JP              2001121929        *   5/2001   ........... B60C 13/003

OTHER PUBLICATIONS

English Translation of JP 2001121929 (Year: 2001).*

* cited by examiner

*Primary Examiner* — Timothy Kennedy
*Assistant Examiner* — Olukorede Esan
(74) *Attorney, Agent, or Firm* — Mark M. Friedman

(57) ABSTRACT

A pneumatic tire has a non-stretchable tread (30) flanked by two shoulder regions (34), and two non-stretchable bead regions (36) for mounting the tire to a wheel, each bead region being connected via a sidewall to the corresponding bead region. Each sidewall has a first portion (38) extending inwardly relative to a width of the tire from one of the bead regions (36) to a deflection region (40), and a second portion (42) extending outwardly relative to the width of the tire from the deflection region (40) to a corresponding one of the shoulder regions (34). A non-stretchable girth-limiting configuration (44, 46, 56) and a radial reinforcing structure (48, 50, 52) are associated with the first portion (38) of each of the sidewalls, thereby limiting radial flexing of first portion (38) and maintaining an annular concavity between the bead region (36) and the shoulder region (34).

10 Claims, 16 Drawing Sheets

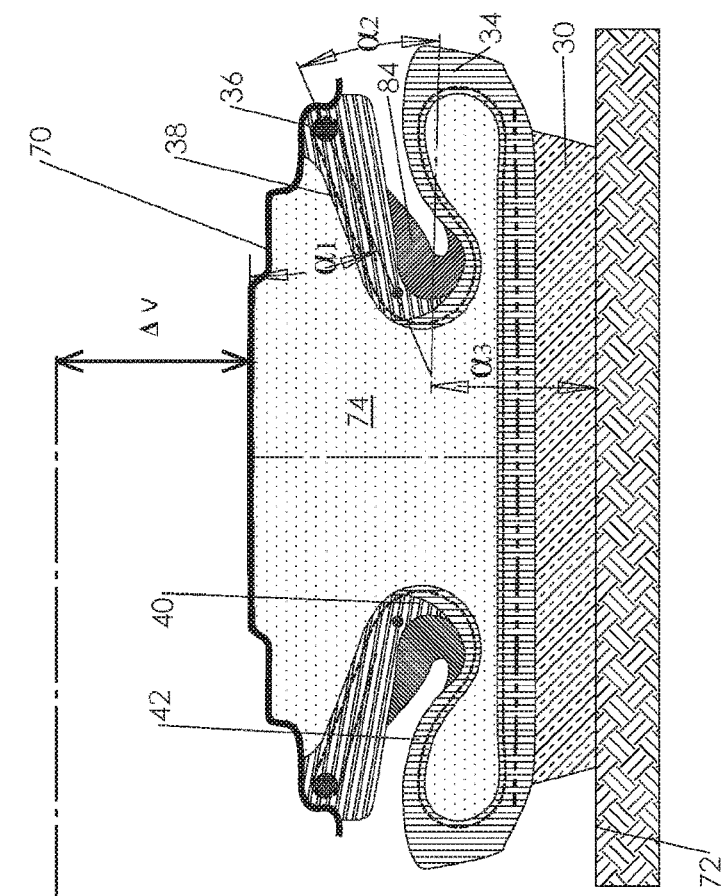
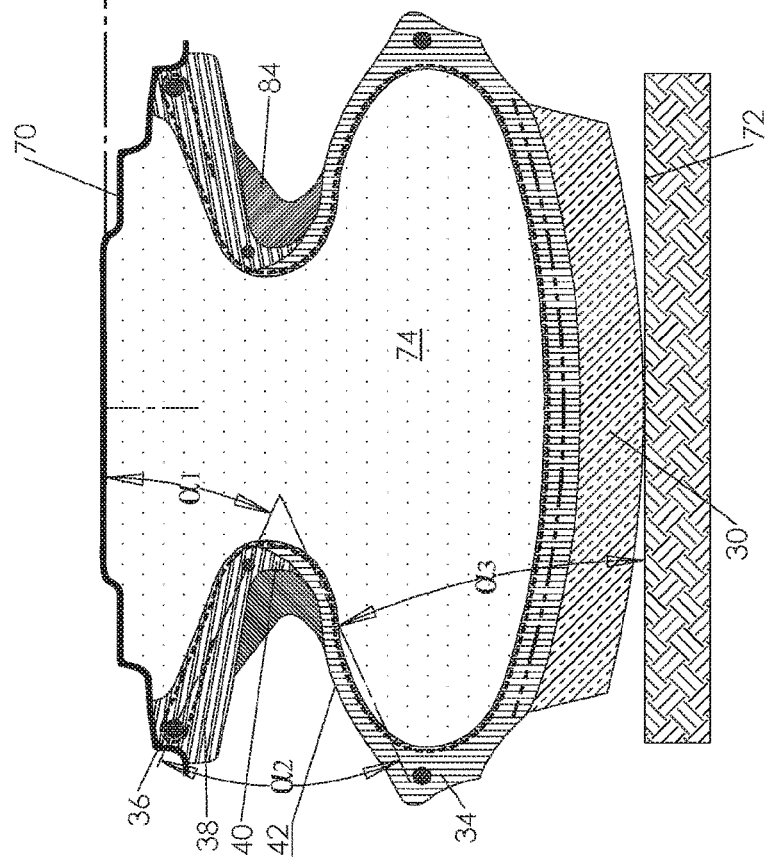
FIG. 9B
FIG. 9A

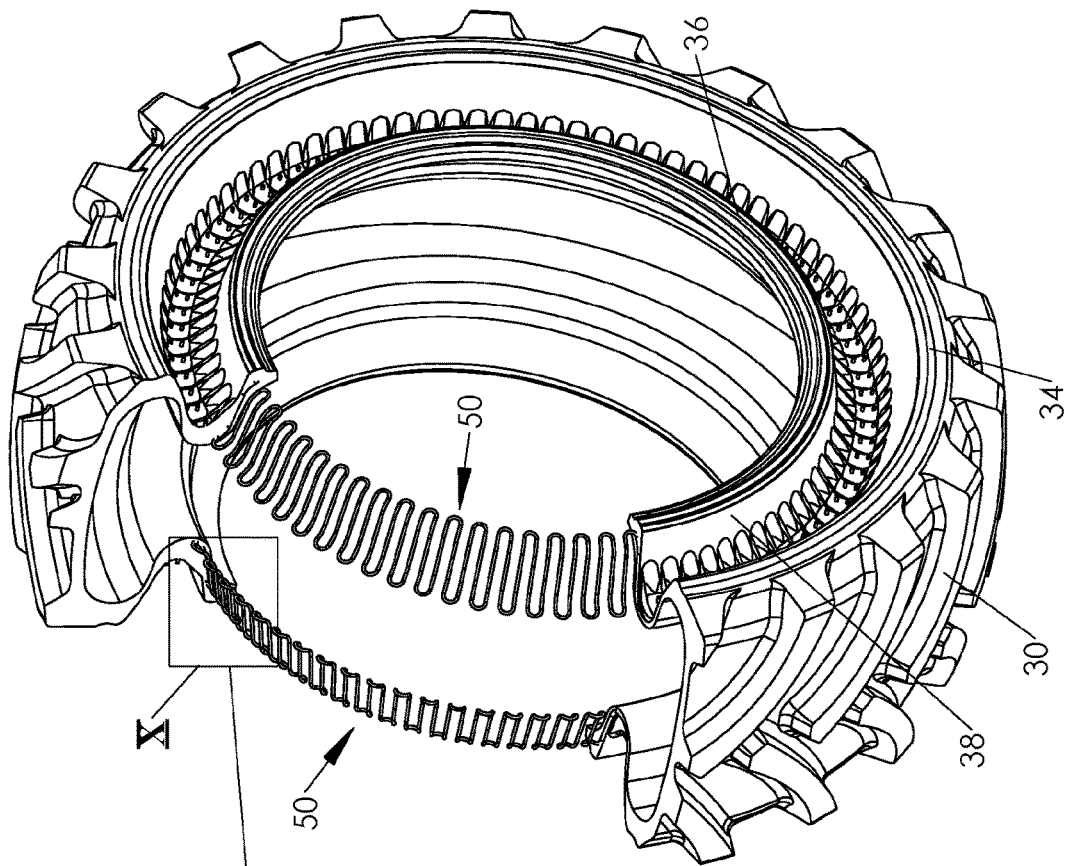
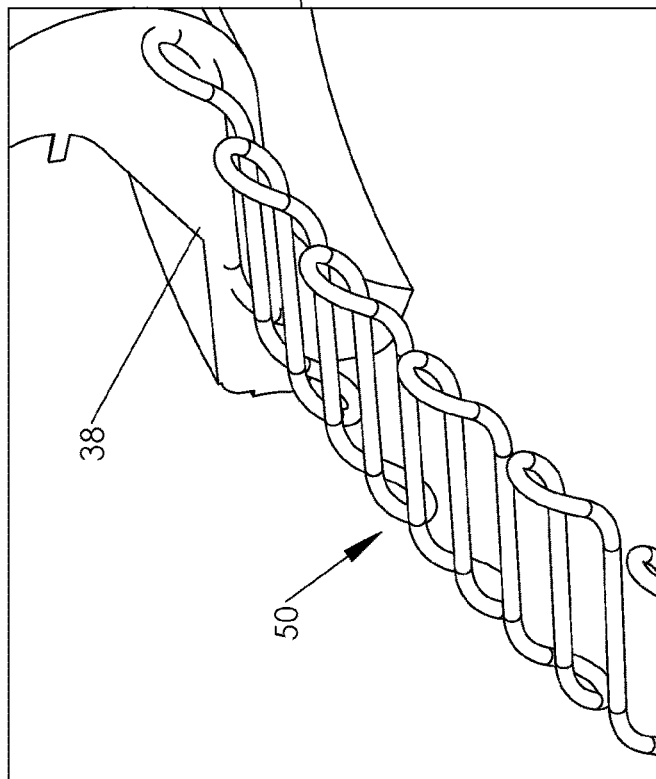
FIG. 10A
FIG. 10B

PNEUMATIC TIRE WITH ANNULAR SIDEWALL CONCAVITY

FIELD AND BACKGROUND OF THE INVENTION

The present invention relates to pneumatic tire and, in particular, it concerns a pneumatic tire with an annular sidewall concavity.

As illustrated in FIG. 1A, a conventional pneumatic tire 200 generally has a tread 202 for engaging the underlying surface, two beads 204 for mounting the tire to a wheel 206, and two sidewalls 208, each extending from one of the beads to a corresponding side of the tread. The sidewalls are usually slightly convex and operate primarily as a "diaphragm", being stretched by internal pressure and bearing load primarily through in-plane tension. The sidewalls typically have little ability to bear in-plane compression, and in the event of a reduction in vertical height of the sidewall (e.g., through excess load or reduction in air pressure), the sidewalls tend to collapse outwards as illustrated in FIG. 1B. In this state, the tire has greatly reduced stability against lateral forces, easily deforming through a rolling motion to the form of FIG. 1C, with a lateral displacement 210.

A pneumatic tire structure proposed in PCT Patent Application Publication WO 2013/014676 A1 (referred to below as "the '676 publication") provides a tire as shown in partial view in FIG. 2 (corresponding to FIG. 6A of the '676 publication, reference numerals being referred to in parentheses) in which the sidewalls have a V-shaped cross-sectional profile defining an annular recess between a radially-inner conical surface (150) and a radially-outer conical surface (130). The proposed V-shaped sidewall geometry offers various advantages of maintaining tread contact under high loads and/or low operating pressures, while at the same time maintaining lateral stability.

In order to maintain the V-shaped geometry under internal air pressure pushing the V-shaped carcass sidewall outward, the '676 publication employs radially-rigid inner and outer conical surfaces (130, 150) which generate a wedging ("valve lock-up") effect between them. In order to render most of the sidewall radially rigid, a relatively thick and heavy sidewall structure is used, as significant rigidity along the inner and outer cones is required in order to obtain the wedging ("valve lock-up") effect. Moreover, flexion between the radially rigid inner and outer cones occurs in a relatively localized transition region, concentrating a relatively large amount of deflection over a limited narrow area of rubber, thus potentially generating heat and/or rubber fatigue.

SUMMARY OF THE INVENTION

The present invention is a pneumatic tire with an annular sidewall concavity.

According to the teachings of an embodiment of the present invention there is provided, a pneumatic tire comprising: (a) a substantially non-stretchable tread encircling a tire axis, the tread extending between two shoulder regions; (b) two non-stretchable bead regions for mounting the tire to a wheel; (c) two sidewalls, each of the sidewalls comprising a first portion extending inwardly relative to a width of the tire from one of the bead regions to a deflection region and a second portion extending outwardly relative to the width of the tire from the deflection region to a corresponding one of the shoulder regions; (d) a substantially non-stretchable girth-limiting configuration associated with the first portion of each of the sidewalls and encircling the tire axis; and (e) a radial reinforcing structure associated with the first portion of each of the sidewalls and configured to limit radial flexing of the first portion of the sidewall, wherein the girth-limiting configuration and the radial reinforcing structure are configured such that, when the pneumatic tire is mounted on a wheel and inflated, each of the sidewalls maintains an annular concavity between the bead region and the shoulder region.

According to a further feature of an embodiment of the present invention, the girth-limiting configuration comprises an arrangement of at least one thread integrated into the sidewall.

According to a further feature of an embodiment of the present invention, the radial reinforcing structure comprises an arrangement of reinforcing elements integrated into the sidewall.

According to a further feature of an embodiment of the present invention, the radial reinforcing structure comprises a plurality of layers of radially aligned steel wires fixed in a rubber matrix.

According to a further feature of an embodiment of the present invention, the radial reinforcing structure comprises an arrangement of external reinforcing elements deployed in contact with an external surface of the first portion of the sidewall.

According to a further feature of an embodiment of the present invention, the girth-limiting configuration comprises an arrangement of at least one thread integrated with the radial reinforcing structure.

According to a further feature of an embodiment of the present invention, at least part, and preferably a majority, of an area of the second portion of the sidewall has a diaphragm-like wall structure.

According to a further feature of an embodiment of the present invention, at least part, and preferably a majority, of an area of the second portion of the sidewall comprises diagonal plies including threads oriented at oblique angles to a radial direction.

Although the tire of the present invention does not fit the conventional definitions of either a "radial" or a "bias" tire (known sometimes as "diagonal" tire), it should be noted that in most particularly preferred embodiments of the present invention, a radial ply extends from side to side along the cross section of the tire, i.e., from bead to bead. The radial ply may be a continuous ply, or may include several plies with some overlap between them. It should also be understood that, when referring to the term radial, it may refer either to an exact radial direction, i.e., 90° to the peripheral direction, but ply directions varying from exact radial by up to about 5%, and in some cases up to 10°, are also typically considered "radial".

Various components of the tire of the present invention are referred to herein as "substantially non-stretchable". This phrase is used herein in the description and claims to refer to elements for which, over the normal operating range of pressure and loading, any stretching of the material is limited to not more than about 5%, preferably no more than 3%, and is typically negligible. These substantially non-stretchable qualities are a common requirement of various conventional tire components, such as most tire treads and tire beads, and are used in a similar sense herein. Outside the normal operating ranges, larger variations may in some cases occur, for example, during an initial tensioning of the material.

The term "thread" is used herein to refer generically to any flexible fiber, filament, cord, wire or cable deployed to bear tension. Threads thus defined may range from standalone metal cables down to fine threads deployed in a rubber matrix as part of various plies or "breaker" structures.

The term "concave" or "concavity" are used herein to refer to any and all surface geometry in which a straight line drawn from one region of the surface to another region of the surface passes through free space external to the surface. The terms thus defined do not imply any particular shape or symmetry to the concavity. Where referred to as an "annular concavity", this indicates that the concavity extends continuously around an axis, but does not require circular symmetry. (Typically, a tire will closely approximate circular symmetry when unloaded, but will deviate from that symmetry when supporting a load.)

BRIEF DESCRIPTION OF THE DRAWINGS

The invention is herein described, by way of example only, with reference to the accompanying drawings, wherein:

FIGS. 9A-9C are schematic cross-sectional views taken through the lower part of the tire and rim of FIG. 3 in a vertical plane parallel to a tire axis in a normally-inflated state, a partially-deflated state, and a partially-deflated state under transverse load, respectively;

FIG. 10A is a partially cut-away isometric view of a tire according to a variant implementation of the present invention, illustrating a spring-like stiffening element;

FIG. 10B is an enlarged view of the region of FIG. 10A designated X;

DESCRIPTION OF THE PREFERRED EMBODIMENTS

Figures 1A, 1B:
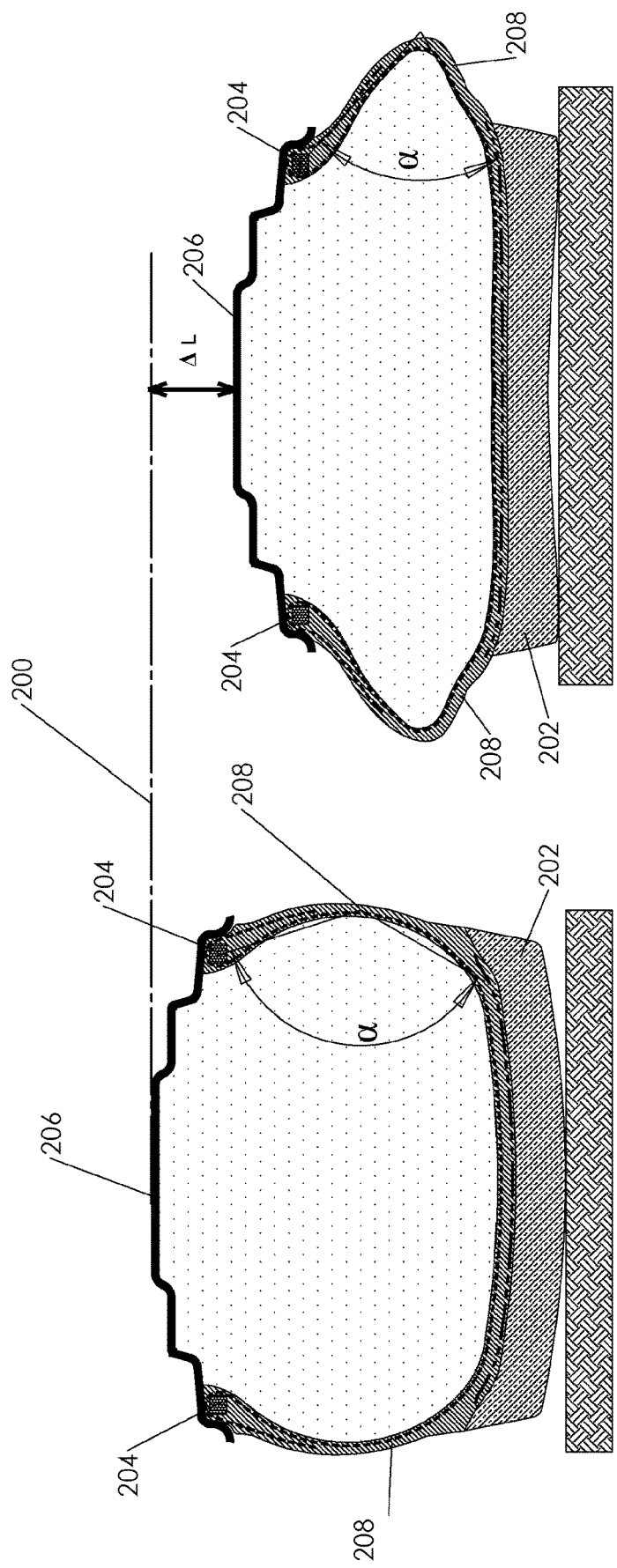
FIGS. 1A-1C, described above, are schematic cross-sectional views taken through a conventional radial tire in a normally-inflated state, a partially-deflated state, and a partially-deflated state under transverse load, respectively.

The present invention is a pneumatic tire with an annular sidewall concavity.

The principles and operation of tires according to the present invention may be better understood with reference to the drawings and the accompanying description.

Referring now to the drawings, FIGS. 3-13B illustrate a number of variant implementations of a pneumatic tire, constructed and operative according to various embodiments of the present invention. Referring generically to these variants, the pneumatic tire of the present invention includes a substantially non-stretchable tread 30, providing a ground-contact profile extending around a tire axis 32. Tread 30 is flanked on each side by a shoulder region 34. The tire also features two non-stretchable bead regions 36 for mounting the tire to a wheel. Two sidewalls extend between bead regions 36 and the corresponding shoulder region 34. Each sidewall includes a first portion 38 extending inwardly relative to a width of the tire from one of the bead regions 36 to a deflection region 40, and a second portion 42 extending outwardly relative to the width of the tire from deflection region 40 to a corresponding one of shoulder regions 34. The overall form of each sidewall thus exhibits an annular concavity between bead region 36 and shoulder region 34.

In this context, it should be noted that the term "axis" is used to refer to a central axis of the tire when undeformed, corresponding to an axis of rotation of a wheel onto which the tire is fitted, but is used intuitively to refer to such a line of reference even when the tire is deformed and no longer approximates to circular symmetry. Similarly, the tread and various other features of the tire are referred to as encircling the axis if they form a closed loop around the axis, without requiring that they have circular symmetry. Typically, such elements do closely approximate circular symmetry in an undeformed state of the tire (other than various repetitive patterns such as tread patterns, reinforcing elements etc.), but diverge from symmetry during deformation of the tire.

Figure 1C:
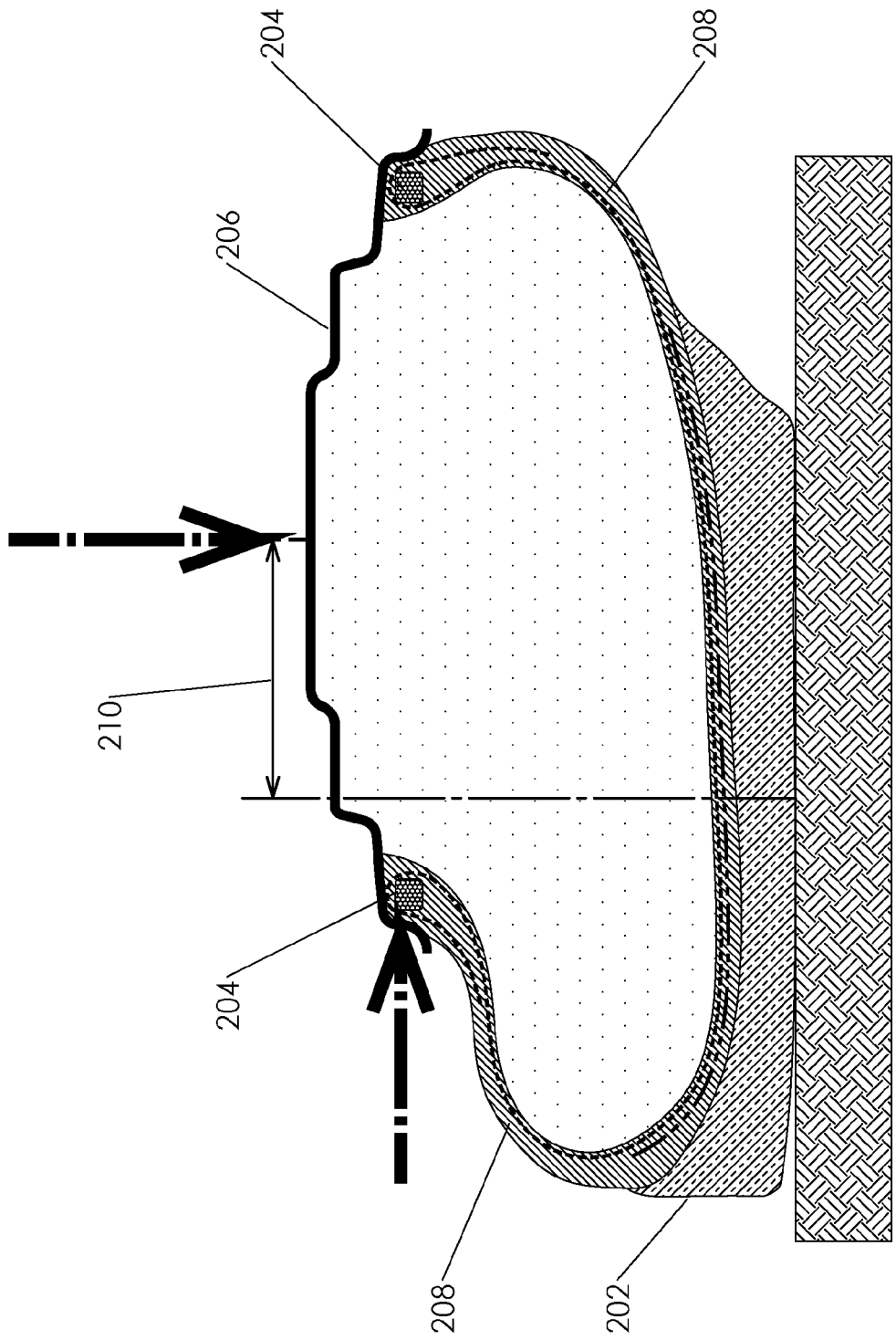

The form of the tires of the present invention with an annular sidewall cavity typically provides one or more of a number of advantages over conventional pneumatic tire without such an annular sidewall cavity (such as that of FIGS. 1A-1C discussed above). Specifically, during the deformation of a standard tire as illustrated in FIGS. 1A-1B, the entire deformation caused by vertical displacement $\Delta V$ (through heavy loading and/or reduced internal pressure) is applied to a single angle $\alpha$ where the sidewall starts to fold on itself, causing extreme deformation from the "normal" inflated state. In contrast, the equivalent vertical displacement $\Delta V$ of a tire according to the present invention as illustrated in FIGS. 9A-9B is distributed between 3 preformed angles which effectively form a bellows structure, leading to a less extreme change in shape. In other words, it may be comparing bending or deforming a flat surface vs. bending or deforming an 'accordion' like surface.

Figure 9C:
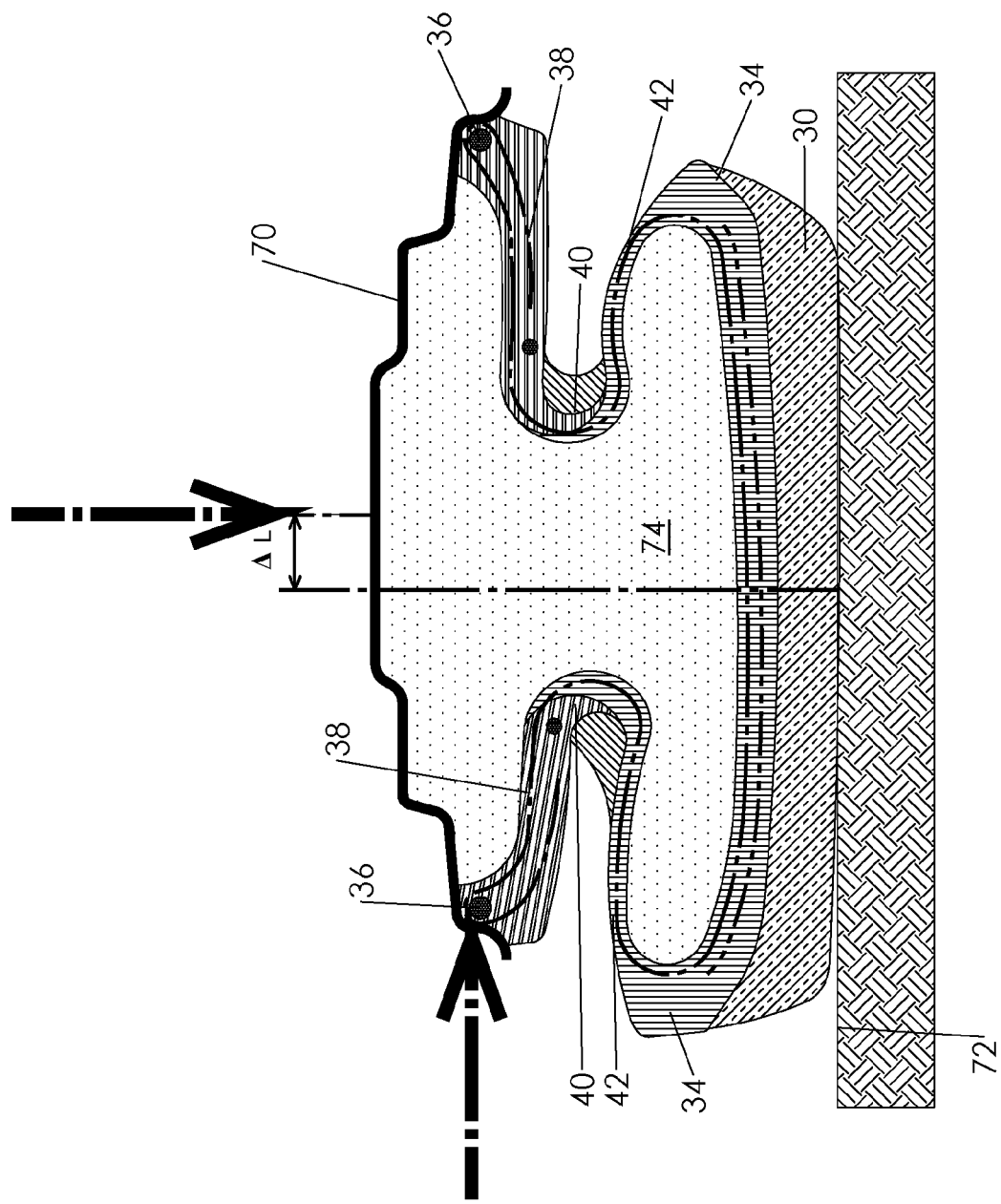

The difference in form also provides pronounced advantages in terms of lateral loading. As load is applied on the tire along a lateral direction (along axis 32 in FIG. 3), the wheel rim delivers force to first portion ("inner cone") 38 by compression (first portion being radially reinforced, as further discussed below), and hence transfers the force via tension along second portion ("outer cone") 42. Since tread 30 is pressed against the ground and is itself reinforced with reinforcement plies and relatively thick rubber tread features, it is in effect anchored by mean of friction to the ground, thus anchoring also shoulder region 34. Outer cone 42 is thus stretched between deflection region 40 at the end of the inner cone 38 and shoulder region 34, thereby restraining inner cone 38 and hence the wheel rim and the vehicle from further lateral displacement, as illustrated in FIG. 9C. The lateral displacement ΔL is further constrained by air pressure as typically the volume of the carcass is reduced by lateral tire deformation, and since the quantity of air remains constant, its pressure will increase with lateral deformation, thus pushing the tire carcass back towards its original symmetrical shape. However, particularly in cases of reduced air pressure, lateral forces are primarily opposed by the sidewall of the tire, and more specifically compression of inner cone 34 and tension in outer cone 42, giving the tire considerable lateral stiffness independent of the contained air pressure.

This contrasts to a standard tire, where lateral stability depends primarily on air pressure and, as a result, the tire will deform significantly more under the same lateral force than the tire of the present invention, as shown in FIG. 1C.

In order to maintain the aforementioned annular cavity in the sidewalls, the envelope of the tire carcass of the present invention defines a volume that is smaller than could theoretically be enclosed by the carcass. In other words, the internal volume of the inflated tire is limited by mechanical constraints other than those provided by elastic deformation of the rubber of the carcass of the tire.

Figure 14B:
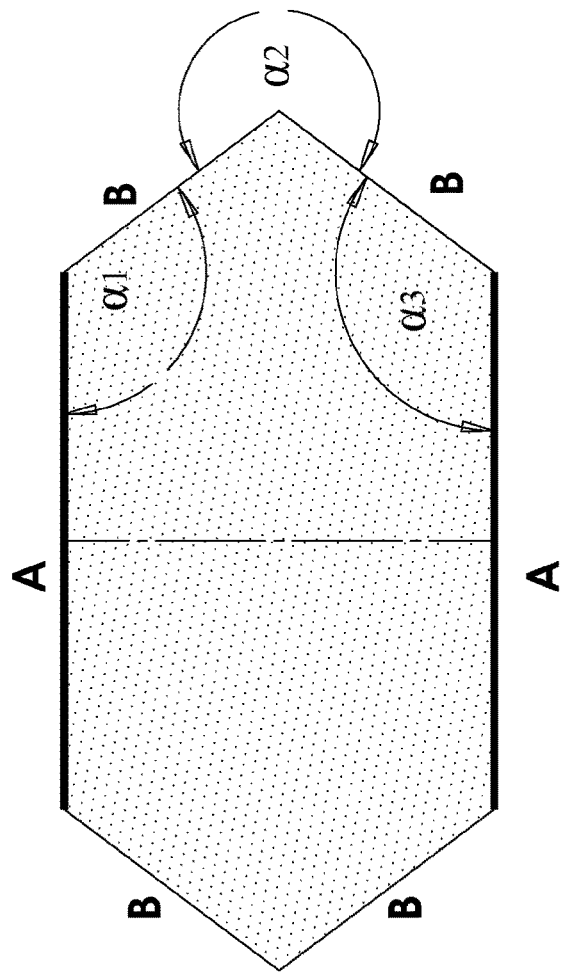
FIGS. 14A and 14B are schematic geometrical constructs illustrating polygonal forms which can be formed with six sides of a cross-sectional form with and without, respectively, a mechanical limitation on outward inversion of the geometrical form.
Figure 14A:
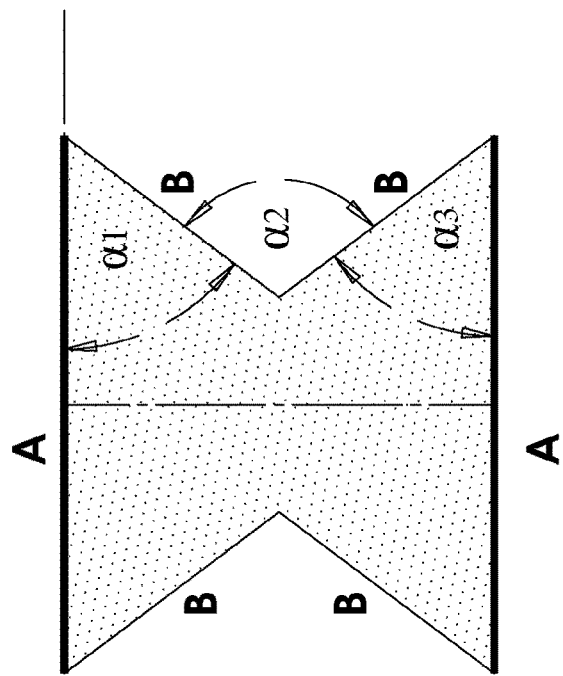

To illustrate this definition schematically, FIGS. 14A and 14B are examples of two geometrical constructs which correspond roughly to cross sections of two similar envelopes with significantly different volume. More specifically, FIGS. 14A and 14B both show a '6 sided shape' (2 sides 'A' and 4 sides 'B') where FIG. 14B defines a significantly larger cross-sectional area than FIG. 14A. If the sides of the 6-sided shape are non-stretchable, then under normal conditions a flexible envelope as in FIG. 14A will tend to deform to define a larger volume as in FIG. 14B when inflated, since compressed gas applies forces outwards to expand the volume from a higher pressure state to a lower pressure state.

According to the teachings of the present invention, it is desired to maintain the constrained-volume inflated form with an annular cavity in the sidewalls, corresponding to a roughly V-shaped sidewall form, to provide enhanced radial mobility (both compression and slight extension from the average radius) to accommodate radial deformation, corresponding to vertical loading, while maintaining relative rigidity against lateral deformation.

Figure 2:
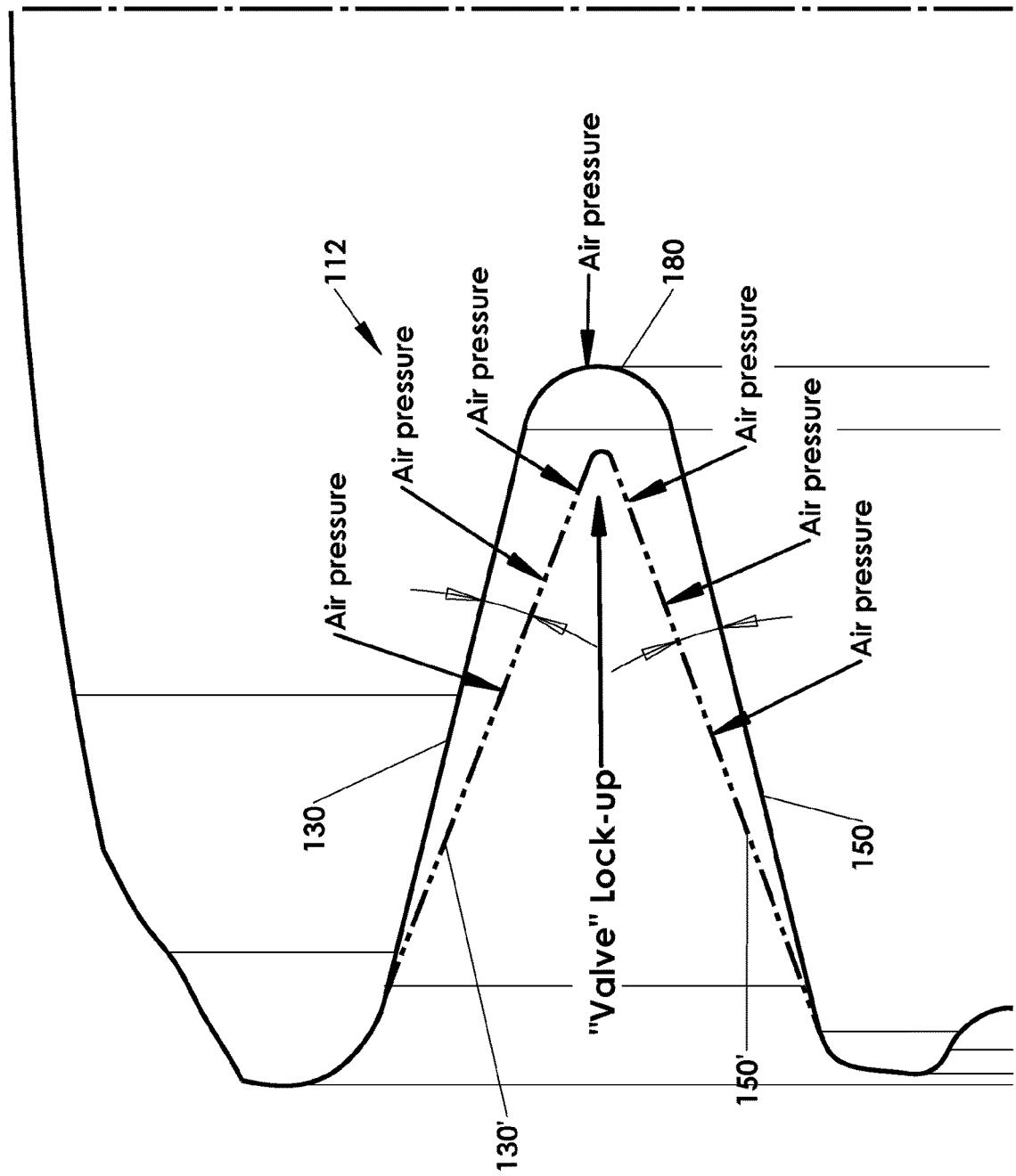
FIG. 2, described above, is a reproduction of FIG. 6A of PCT Patent Application Publication WO 2013/014676 A1, using the original reference numerals.
Figure 3:
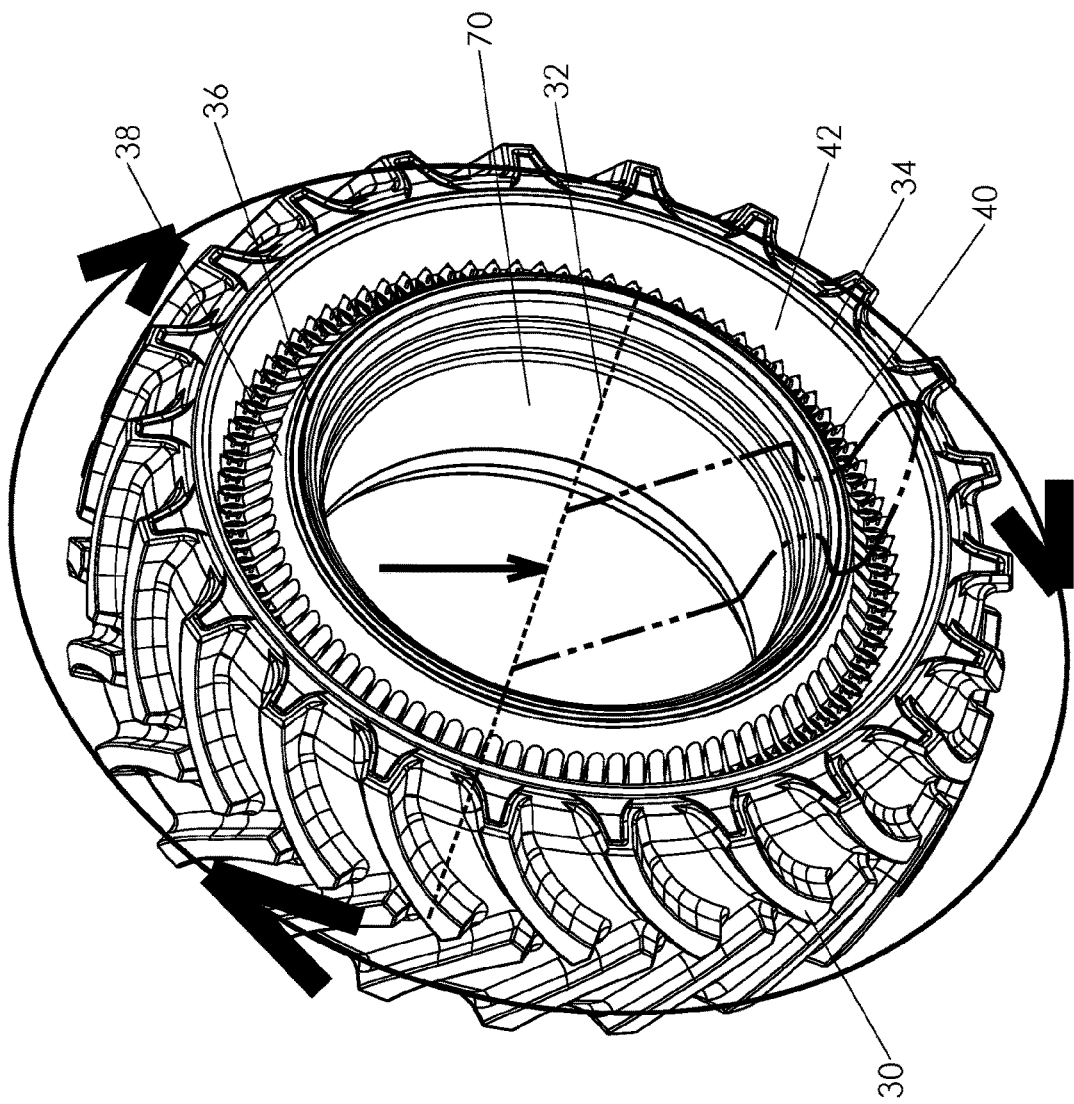
FIG. 3 is an isometric view of a tire, constructed and operative according to the teachings of an embodiment of the present invention, attached to a wheel rim.
Figure 4B:
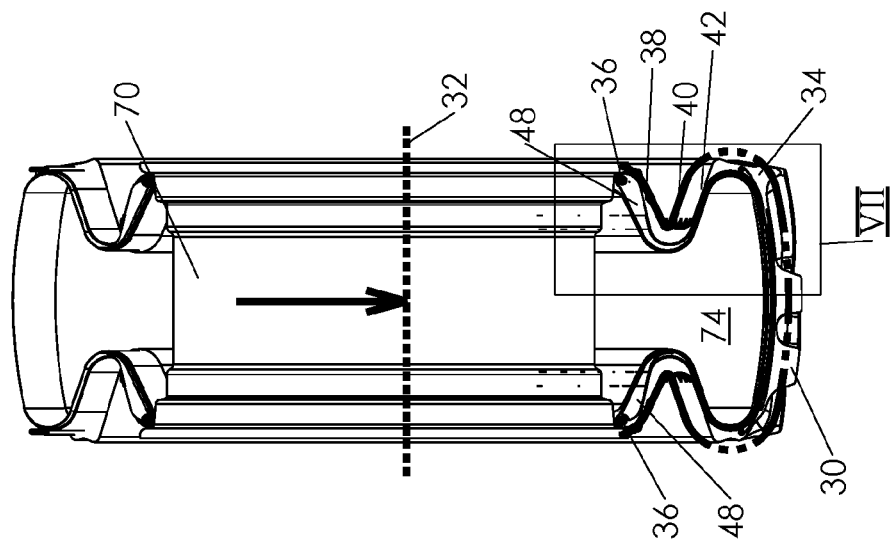
FIG. 4B is a cross-sectional view taken through the tire and rim of FIG. 3, the view being taken along a vertical plane passing through an axis of the wheel.
Figure 4A:
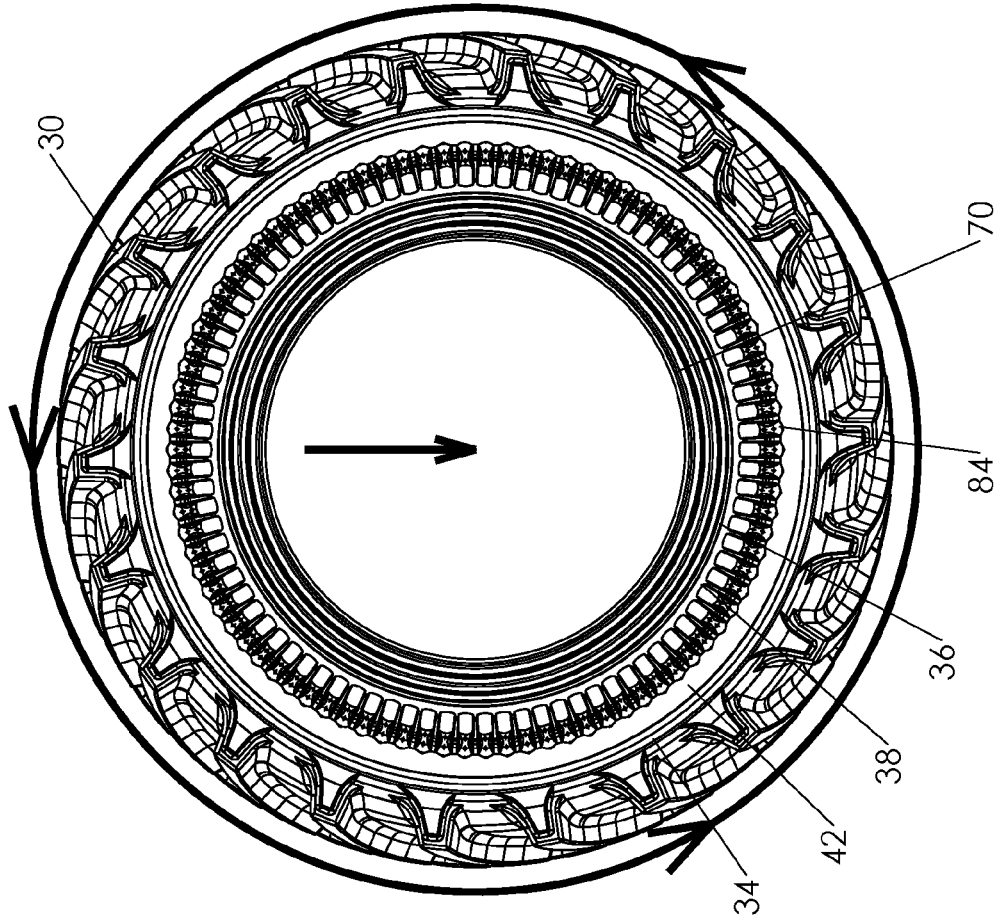
FIG. 4A is a side view of the tire and rim of FIG. 3.

One family of solutions for maintaining a form with a V-shaped recess around the lateral walls is described in the aforementioned WO 2013/014676 A1 as discussed above with reference to FIG. 2. FIG. 5A illustrates more clearly the operating principle used there to restrain the geometry. In that case, the geometry is maintained by employing radially-rigid oppositely-angled conical surfaces, inner cone (150) and outer cone (130), which resist outward inversion of the V-shape due to a wedging effect between the two radially-reinforced converging surfaces. (It should be noted that FIG. 5A has been newly drawn in order to illustrate this operating principle. The content of this drawing is new, and no part of the drawing is admitted as prior art other than to the extent that the content is explicitly taught by the '676 publication.) Reliance on the above wedging effect requires that both the inner and outer cones are formed with considerable rigidity against radial bending, and that any flexing under load occurs are localized regions at the extremities of the cones and at the junction of the cones.

Figure 5B:
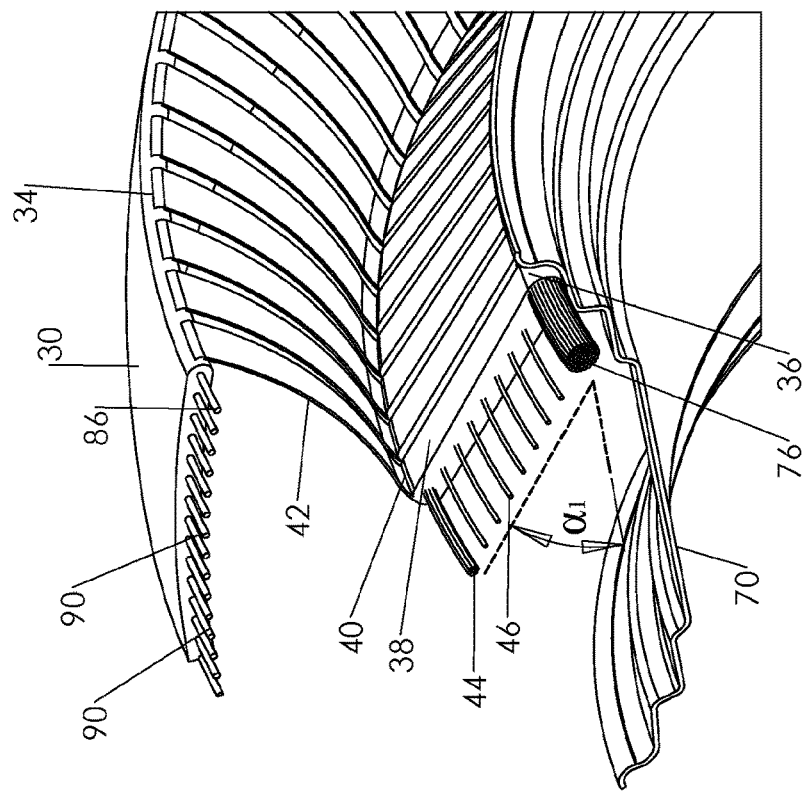
FIGS. 5A and 5B are schematic partial isometric views contrasting a principle of operation of the prior-art tire of FIG. 2 and the tire of FIG. 3 according to the teachings of the present invention, respectively.
Figure 5A:
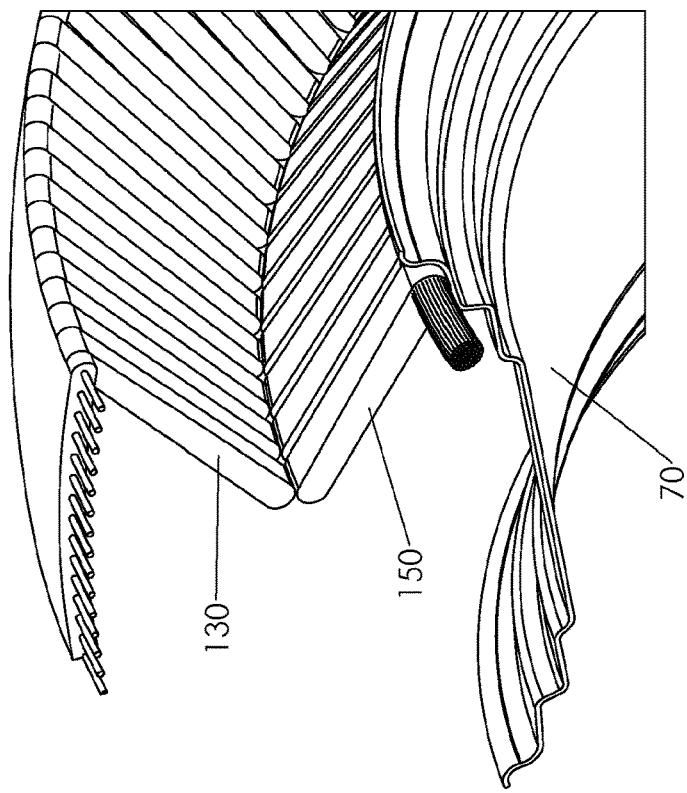
Figure 6:
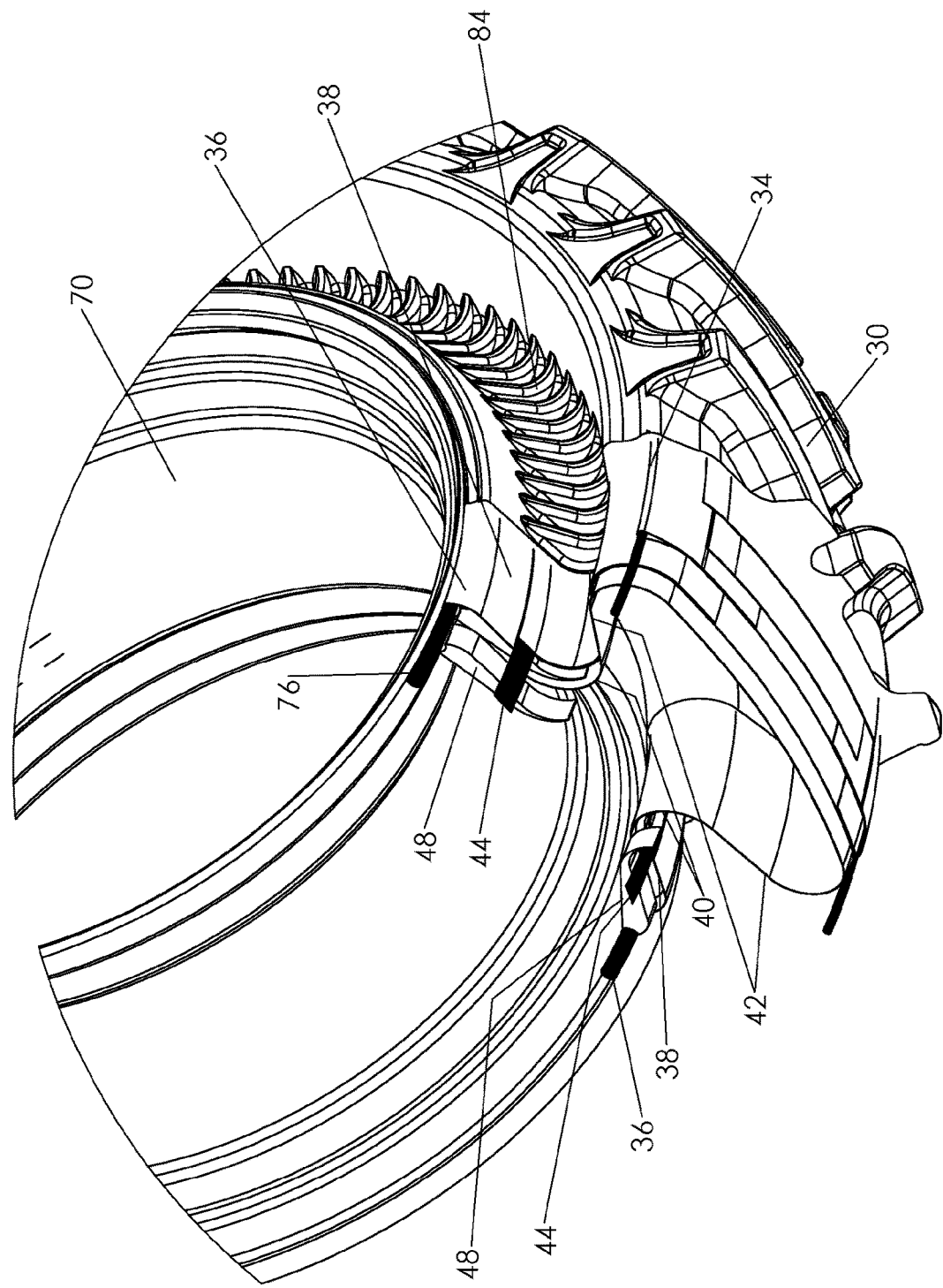
FIG. 6 is a partially cut-away isometric view of the tire and rim of FIG. 3.

According to the teachings of the present invention, it has been found that, in certain cases, additional advantages may be provided by forming at least part of the radially-outer portion of the lateral wall recess, i.e., outer cone 42, from flexible material which is not inherently stiffened sufficiently to provide the aforementioned wedging effect, as illustrated in FIG. 5B. This allows the use of relatively thin and flexible material better able to accommodate large vertical deflections.

The lack of inherent stiffness in outer cone 42 to prevent radial buckling according to this aspect of the present invention requires an alternative approach to restraining the tire envelop from inverting outwards and being stretched to its default bigger volume, i.e., "ballooning out" as illustrated schematically in FIG. 14B.

Thus, according to certain particularly preferred implementations of the present invention, outward inversion of the first portion ("inner cone") 38 of the sidewall is achieved by combining:
  a substantially non-stretchable girth-limiting configuration associated with first portion 38 of each sidewall; and
  a radial reinforcing structure associated with first portion 38 of each sidewall, the radial reinforcing structure being configured to limit radial flexing of first portion 38 of the sidewall.

The combination of the girth-limiting configuration and the radial reinforcing structure together prevent outward inversion of first portion 38, thereby maintaining the desired form of the tire with an annular concavity between the bead region and the shoulder region when the tire is mounted on a wheel and inflated.

A first non-limiting but particularly preferred implementation of a girth-limiting configuration and a radial reinforcing structure, both implemented as structures integrated into the sidewall of the tire, is best seen in FIGS. 5B-9C.

Thus, certain particularly preferred embodiments of the present invention implement the girth-limiting configuration as an arrangement of at least one thread integrated into the sidewall. The thread may include a flexible, non-stretchable circumferential cable or belt 44 (best seen in FIGS. 5B, 6 and 7) extending around inner cone 38 and deployed so as to limit how much angle $\alpha_1$ can increase. Additionally, or alternatively, the girth-limiting configuration may include a matrix of finer threads 46 integrated within the sidewall material as reinforcing plies. The girth-limiting properties may be imparted by using a zero-angle peripherally-aligned ply. More preferably, a combination of diagonally-aligned plies in successive layers with opposing angular deflections. The fixing of such plies in a hard rubber matrix is effective to provide the substantially non-stretchable properties required for the girth-limiting configuration, as is well known in the art of tire design where such structures are commonly referred to as "breakers", as used in conventional tire treads.

Figure 8B:
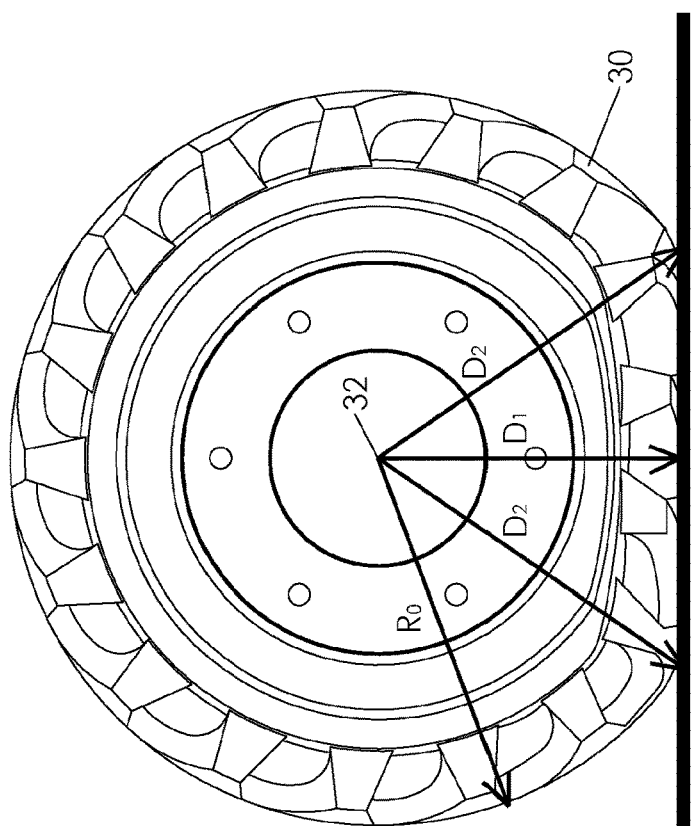
FIGS. 8A and 8B are side views of the tire of FIG. 3 mounted on a wheel and contacting a ground surface; the wheel being showed in a fully inflated and a partially inflated (or heavily loaded) state, respectively.
Figure 8A:
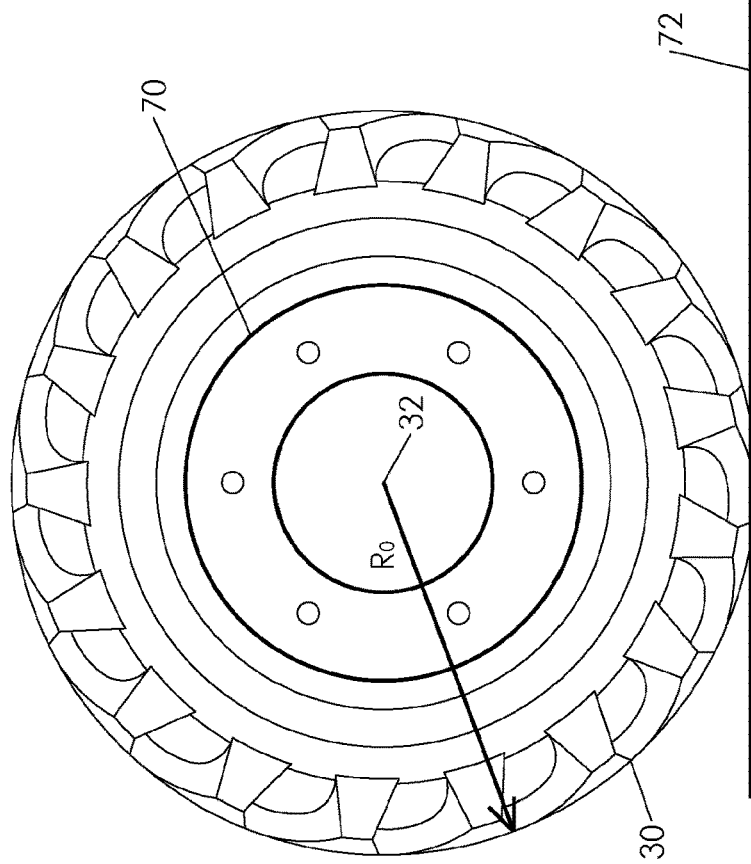

Circumferential belt 44 and/or the breakers do not impose a specific limit on angle $\alpha_1$, but rather limit the total circumference at that region of the inner cone 38. As a result, if one portion of inner cone is deflected radially inwards, other regions of the inner cone typically expand outwards beyond the mean radius of the belt 44. This, in turn, allows parts of the tread of the tire to spread outwards beyond their non-distorted (or average) radial position, thereby enhancing the ability of the tread to maintain contact with the underlying surface over an extended area. For ease of presentation, an example will be presented in FIG. 8B where reference is made to regions around a tire in terms of directions of the hours on a clock face, with 12 o'clock referring to the top of the tire while the bottom side below the axle will be referred to as 6 o'clock. As illustrated in FIG. 8B, the region of tread 30 at "6 o'clock" experiencing vertical compression has its distance from the axis reduced from the average radius $R_0$ to a reduced distance $D_1$, while adjacent regions near the extremities of the ground-contact footprint ("5 o'clock" and "7 o'clock") exhibit a slightly increased distance from the axis $D_2$. Without in any way limiting the present invention, it is believed that this ability of the tread to move slightly outwards from the mean radius contributes to the ability of the tire to accommodate deformations as shown without exhibiting the inward buckling of the tread within the contact footprint which commonly plagues conventional tires working at reduced pressure and/or high loads.

The overall limitation on circumference imposed by the girth-limiting configuration is sufficient to prevent outward inversion of first portion (inner cone) 38, without relying on second portion 42 for mechanical support. This allows use of a much more flexible outer portion of the tire, and particularly, second portion 42, so that second portion 42 preferably acts as a diaphragm, stretched between flexion region 40 at the end of first portion 38 and shoulder region 34 at the edge of tread 30, with consequent advantages, as will be detailed further below.

The overall effect of this structure is typically a sidewall profile that can endure significantly higher vertical deflection than other approaches, while sustaining high lateral stiffness.

Regarding the radial reinforcing structure associated with first portion 38 of each sidewall, according to certain particularly preferred implementations of the present invention, this is implemented by incorporating radially aligned stiffening elements 48 within first portion 38 of each sidewall. The term "radial" in this context refers to a direction lying within a plane containing central axis 32 of the tire. Stiffening elements 48 are "radially aligned" in the sense that they have a longest dimension which is aligned radially, while they are typically narrow in a transverse dimension. "Radial flexing" refers to changing shape as viewed in a cross-section passing through central axis 32, in contrast to "circumferential flexing", which relates to a change of shape relative to an initially circular shape as viewed along a viewing direction parallel to axis 32. The stiffening elements 48 may be shaped blocks of relatively rigid material, such as metal, various polymers, wood, composite materials and/or inserts of any other material with suitable mechanical properties.

FIGS. 10A and 10B illustrate a further implementation of a radial reinforcing structure in which the radially aligned reinforcing elements, for example, steel wires, are interconnected by connecting portions to form a continuous spring-like element 50 extending around part or all of the tire for integration with first portion 38 of the sidewall. The radial stiffening effect is provided primarily by the radially-extending portions, while the interconnection of these portions serves primarily to facilitate positioning the elements during the production process of the tire, as well as helping to avoid sharp edges and gaining better integration and bonding with the rubber matrix.

Figure 11:
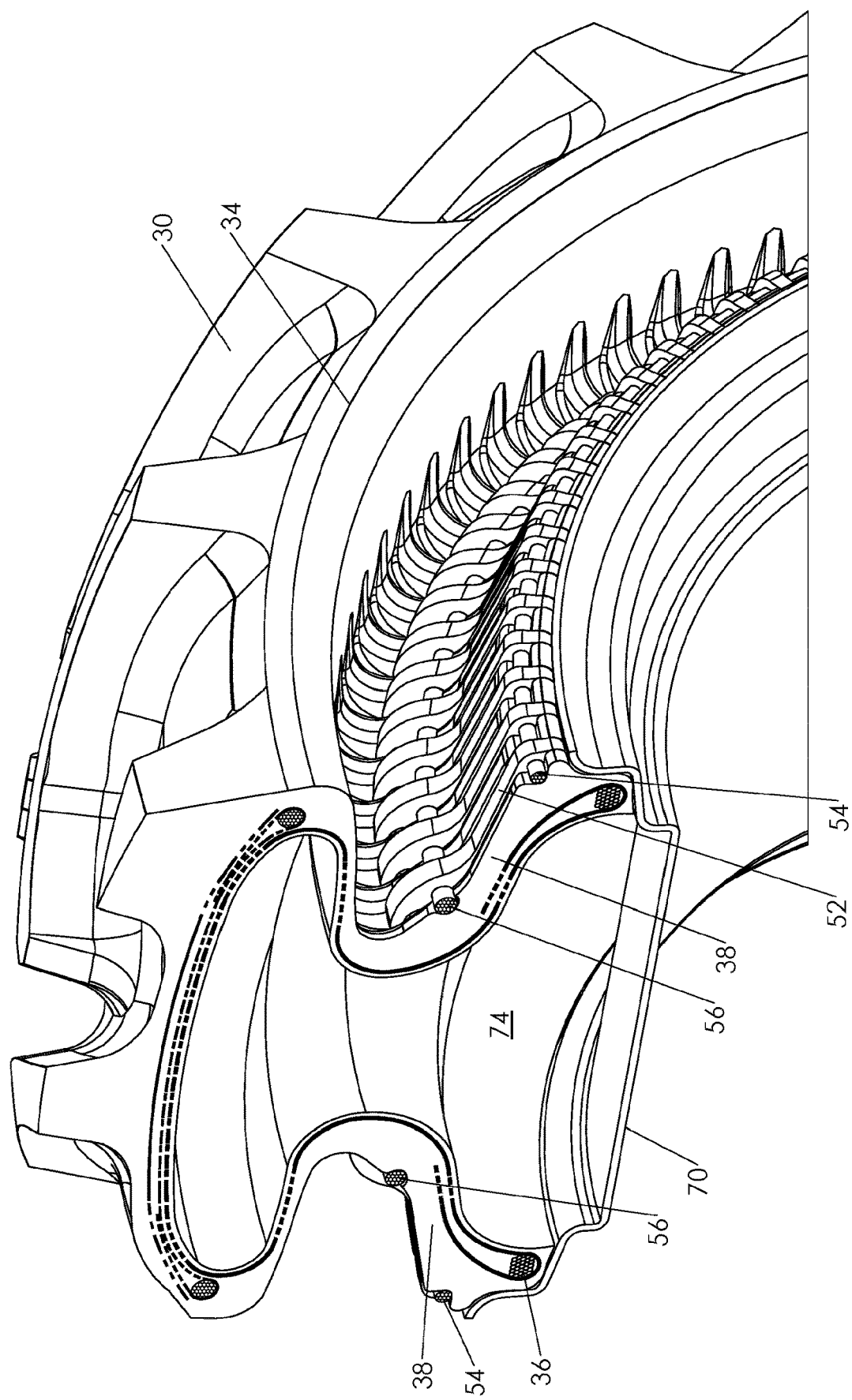
FIG. 11 is a partially cut-away isometric view of a tire according to a further variant implementation of the present invention, illustrating use of an external radial reinforcing structure (stiffening arrangement)
Figure 12:
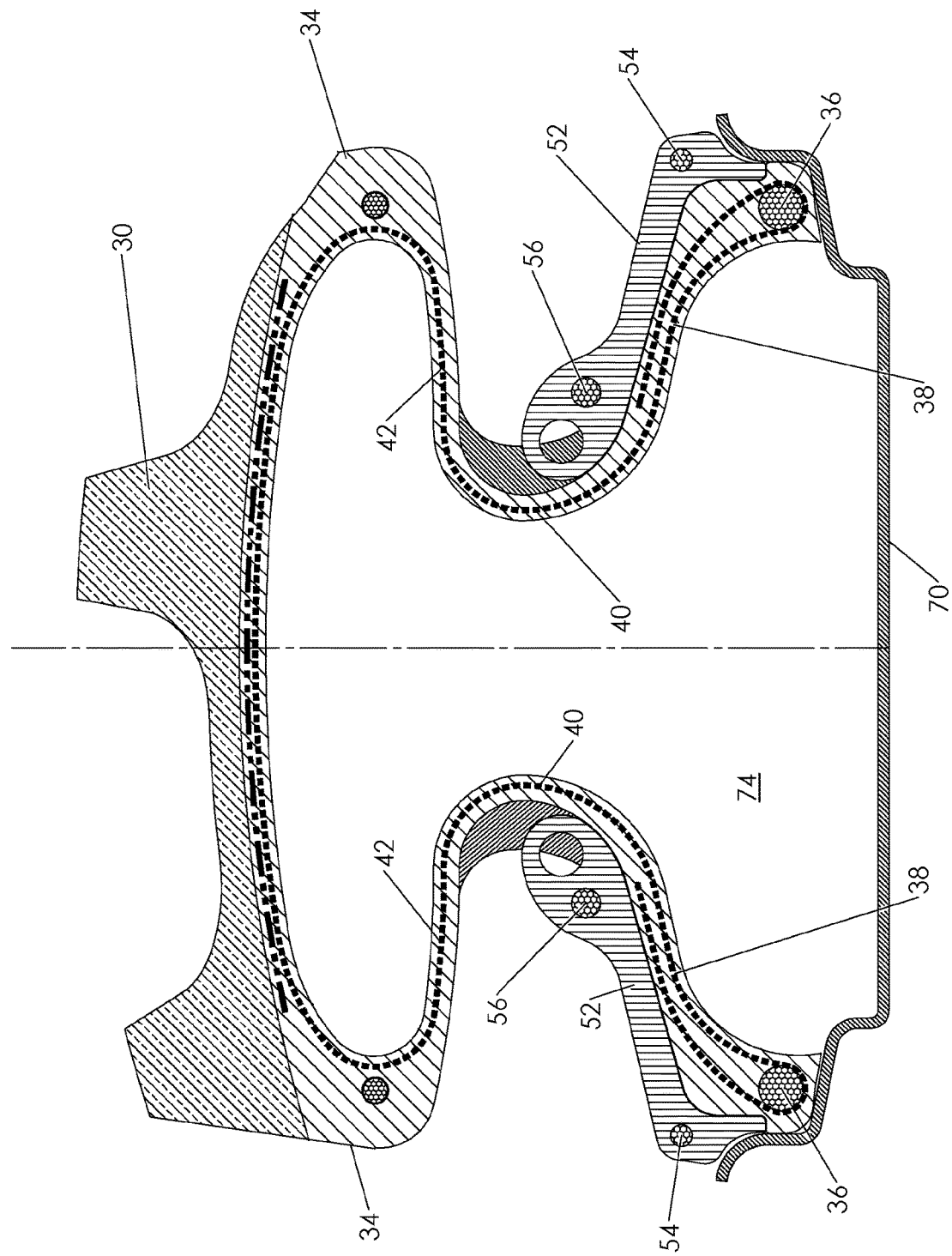
FIG. 12 is a cross-sectional view taken through one side of tire of FIG. 11.

Turning now to FIGS. 11 and 12, these illustrate a further implementation of a tire according to a preferred embodiment of the present invention in which the radial reinforcing structure is implemented using an arrangement of external reinforcing elements deployed in contact with an external surface of first portion 38 of the sidewall. Specifically, in the implementation as illustrated here, radial reinforcement is provided by an array of external ribs 52. Ribs 52 are preferably connected in their inner side, i.e., closer to the wheel rim, by a reinforcement wire 54 and their edges are prevented by the rim from moving laterally away from the carcass. The radially-outermost extremities of ribs 52 are restrained by an external circumferential flex belt 56, thereby providing also the girth-limiting configuration for first portion 38 which engages the internal surface of the ribs when inflated. Ribs 52 preferably have relative high rigidity and therefore will bear lateral forces that may develop under vehicle load in the event of sharp turn or during driving on a side slope, in the same manner as the integrated supports described above. This embodiment may offer advantages of simplification in manufacturing and cost reduction, as well as allowing selective replacement of a relatively simple and lightweight inner rubber carcass while keeping the reinforcing structure for repeat usage.

Figure 13B:
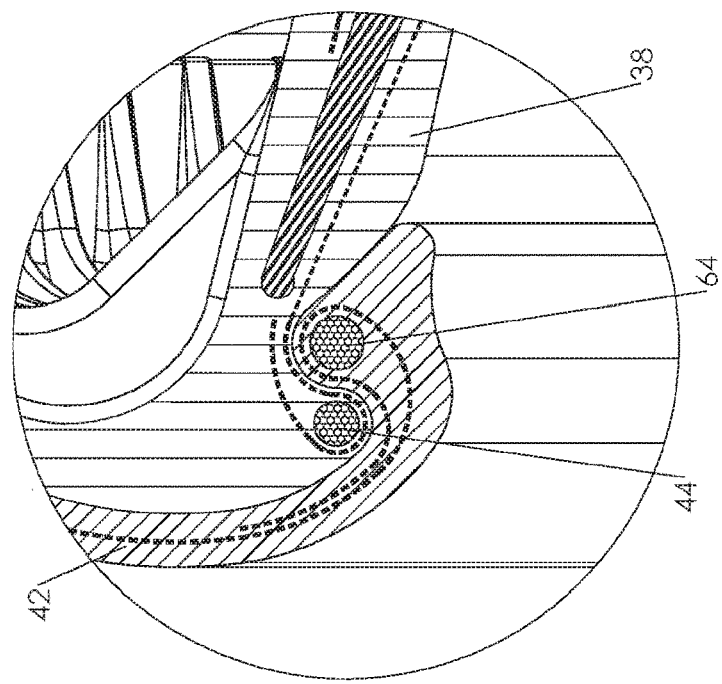
FIG. 13B is an enlarged view of the region of FIG. 13A designated XIII.
Figure 13A:
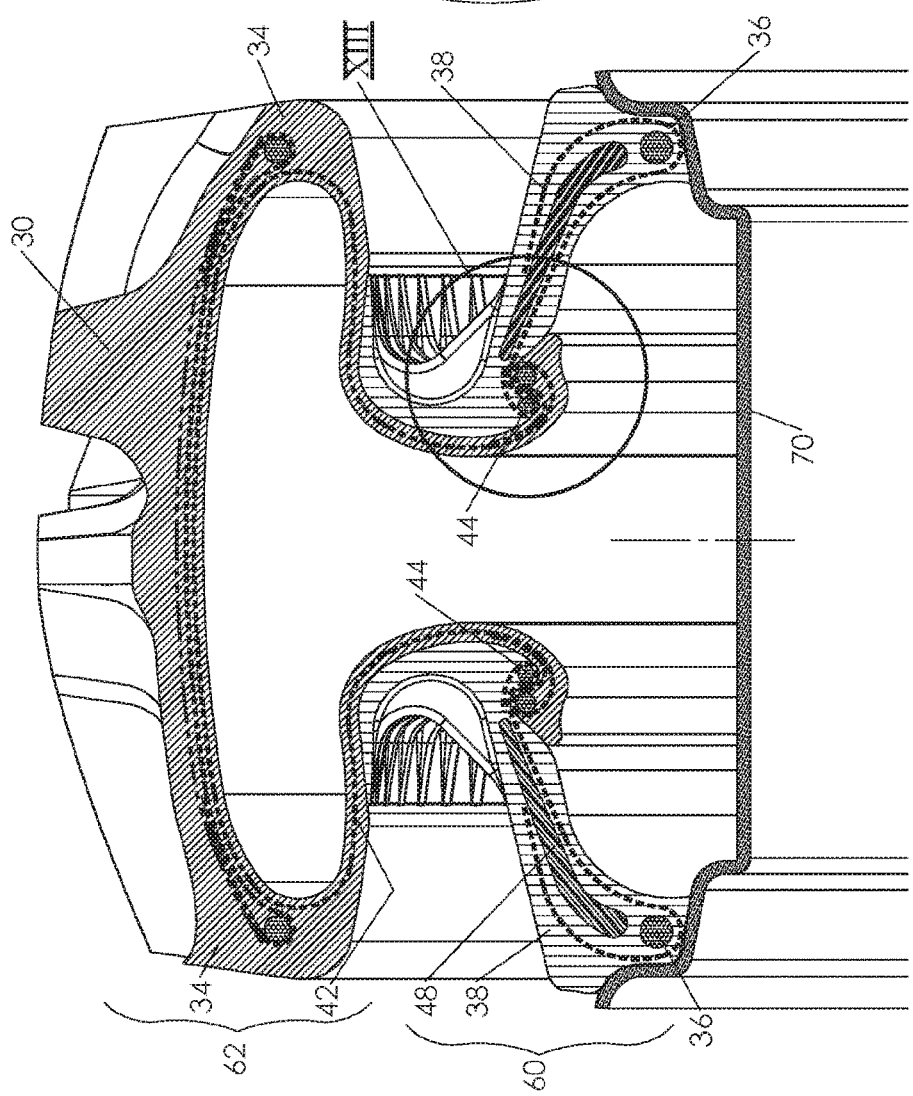
FIG. 13A is a cross-sectional view taken through one side of a tire and wheel rim according to a further variant implementation of the present invention in which the tire is subdivided into two separately-manufactured components.

A further example of an implementation of a tire according to another preferred embodiment of the present invention is illustrated in FIGS. 13A and 13B. In this case, the tire is divided into an inner part 60 which provides bead region 36 and first portion 38, and an outer part 62 which provides second portion 42 integrated with shoulders 34 and tread 30. All properties of the tire preferably remain similar to the previous embodiments as described, but this variation allows for different methods of production for different part of the tire, for example allowing use of press curing in a closed mold for the inner part 60 to achieve better accuracy, while still employing traditional tire curing methods based on steam bladder curing, for the rest of the tire.

One non-limiting example for implementing mechanical interconnection between the two parts of the tire of FIG. 13A is best seen in the enlarged view of FIG. 13B. In this case, an additional circumferential flex belt 64 is integrated with second part 62 and located in overlapping relation to the circumferential flex belt 44. As air pressure within the tire forces the tire envelope to increase its volume, inner circumferential belt 64 is restricted/restrained by circumferential flex belt 44, and the two parts 60 and 62 become increasingly tightened together as pressure increases. It should be noted that this approach is only one of a number of possible approaches, and many other approaches for mechanically interconnecting the two parts may be used, such as for example co-curing, or bonding using chemical reactions or certain glues, after curing, stitching or riveting.

It is likely that the first part 60 will be more expensive to produce than second part 62, but will wear less during tire use. Where interconnection between the two parts is implemented mechanically and reversibly, this embodiment may allow replacing only one part of the tire in the event that one part (such as tread 30) is worn or damaged before the other part needs replacement.

According to all of the above embodiments, certain particularly preferred implementations have a majority of an area of second portion ("outer cone") 42 implemented as a diaphragm-like wall structure. The term "diaphragm-like" is used herein in the description and claims to refer to a structure which withstands tension, but which collapses relatively easily under in-plane compressive forces. For example, in a typical case, a diaphragm-like sidewall can withstand applied in-plane tension of at least an order of magnitude greater than the in-plane compression force which can be supported without collapsing or otherwise folding on itself. The resistance of first portion ("inner cone") 38 to outward inversion according to the various embodiments described above enables the reduction of thickness and/or rigidity requirements on second portion 42 so as to facilitate the use of thin and flexible sidewall materials for second portion 42, thereby also reducing resistance to flexing, internal heating and rate of wear. The resultant structure also has enhanced ability to operate under reduced internal pressure, or to "run flat" without internal air pressure, while maintaining lateral stability of the tire under lateral loads. In certain non-limiting examples, under vertical loading sufficient to reduce a vertical distance of tread 30 from bead region 36, the second portion 42 adopts successive curvatures as best seen in FIG. 9B in which a first curvature is followed by a second, opposite curvature, thereby forming what is referred to herein as an "S-shaped" cross-sectional form. The term "S-shaped" is used herein to refer to any form in which a direction of curvature changes from one sense to the opposite sense, corresponding to a curved form for which the second derivative changes sign.

Second portion 42 in certain preferred embodiments includes over a majority of its area diagonal plies including threads oriented at oblique angles to the radial direction, for transfer of torque/forces from deflection region 40 to shoulder region 34. These diagonal plies may be important in certain embodiments for better bearing the loads which suspend the vehicle wheel from the tire, as well as transfer of driving and braking torque. The plies are most preferably in two opposing spiral directions, which may also be referred to as "bias plies", thereby providing effective torque and force transfer under a wide range of operating conditions from bead region 36, through first portion 38 and second portion 42 to shoulder 34 and tread 30.

In all other respects, the features, materials and production processes employed for implementing the various embodiments of the present invention are similar to the conventional features, materials and production processes employed in the art. Thus, for example, the structures of bead regions 36, and of shoulder regions 34 and tread 30, are typically similar to conventional radial tire structures, employing various plies and reinforcements, with various different layers of rubber, preferably cured together to form the various structures required for the bead and tread, all as is known in the art.

The tires of the invention are mounted on a wheel with a rim 70, which typically a standard tire rim, usually made of steel, and should be considered as a rigid surface. The rim delivers the vertical load, the lateral load and driving/braking torque from a vehicle via the tire to the ground 72. The rim, when fitted with tire, is part of the air chamber 74 that supports the loads that are carried by the tire.

Figure 7:
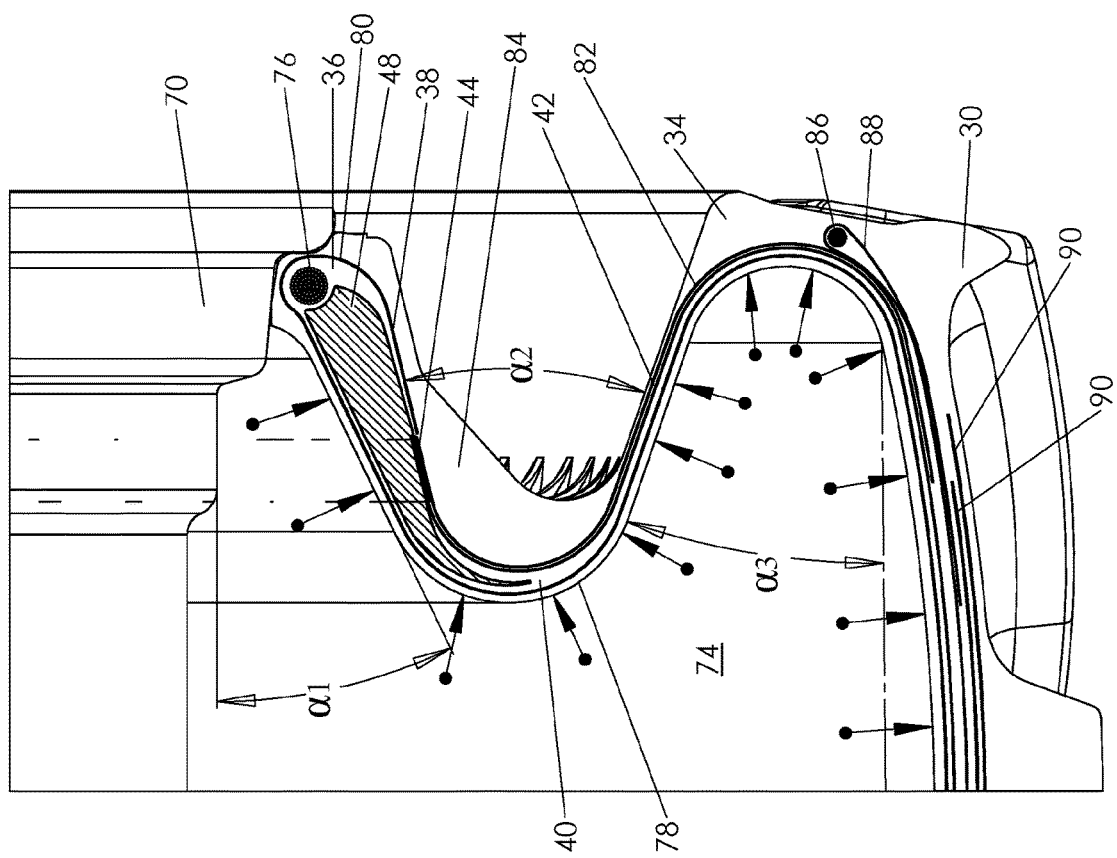
FIG. 7 is an enlarged view of the region of FIG. 4B designated VII.

A number of further typical preferred features of a specific implementation of the tires of the present invention are best seen in the enlarged cross-sectional view of FIG. 7. Bead region 36 typically includes a bead wire 76, usually formed from steel wires wound several times to form a closed, fixed-circumference non-stretchable ring. The layers of the tire structure typically include an inner liner rubber layer 78, having low air permeability, commonly used as the internal surface of tubeless tires.

Further layers of the tire structure preferably include a carcass radial ply 80 formed from directional fabric or steel cords, with the orientation of the cords such that the cords are laid along the radial direction so that the ply is non-stretchable in the radial direction. The carcass radial ply preferably runs along the whole tire radial aspect from bead to bead. In certain cases, this radial ply is supplemented by additional plies 82, around all or part of the carcass, which may include additional radial plies and/or various diagonal plies such as were mentioned above. The additional plies may also serve a function of securing circumferential belt 44 in place during tire manufacture.

In certain implementation, it may be desirable to provide a set of rubber ribs 84 at deflection region 40. Ribs 84 act as a support to limit deflection of region 40 to a desired minimum radius, thereby helping to prevent tight (small radius) folding of the sidewall under the effect of pressure within air chamber 74 which might otherwise result in localized stress applied to the rubber and plies, possibly leading to a breaking point.

In certain preferred cases, shoulder region 34 is reinforced by a circumferential shoulder belt 86, which is typically a belt made of steel wires or textile, polyester, or aramid/KEVLAR® etc. cords similar to the circumferential belt 44 and bead wire 76. Circumferential shoulder belt 86 is preferably implemented with high flexibility in the circumferential direction but helps to restrain the diameter of the shoulder region 34 under the forces applied by the air pressure. Shoulder belt 86 may be anchored in position by shoulder belt wrap 88, typically formed from fabric oriented parallel to the radial direction which extends across the tread. Tread 30 is preferably further reinforced by a number of breaker belts 90, which are belts made of steel cords or other material/fabric such as nylon, polyester-nylon or other fabrics, typically oriented parallel, or at relatively small inclination, to the circumferential direction. In some implementations, breaker belts 90 are formed by successive layers of ply oppositely inclined relative to the circumferential direction, for example, at angles of ±20°. Breaker belts 90 have relatively high flexibility in the circumferential direction, i.e., contribute low resistance when tire is deflected under load in the vertical direction, but form a non-stretchable region extending circumferentially around tread 30. In some implementations, one or more additional radial belt may also be used to increase the stiffness of tread 30 in the lateral direction.

Tread 30 is preferably made from rubber configured to deliver torque from the tire to the ground 72. The design of the tread will vary according to tire specifications and may include features to facilitate draining of water during ravel on a paved road or to obtain high grip during travel on soft soil.

To the extent that the appended claims have been drafted without multiple dependencies, this has been done only to accommodate formal requirements in jurisdictions which do not allow such multiple dependencies. It should be noted that all possible combinations of features which would be implied by rendering the claims multiply dependent are explicitly envisaged and should be considered part of the invention.

It will be appreciated that the above descriptions are intended only to serve as examples, and that many other embodiments are possible within the scope of the present invention as defined in the appended claims.

What is claimed is:

1. A pneumatic tire comprising:
(a) a substantially non-stretchable tread encircling a tire axis, said tread extending between two shoulder regions;
(b) two non-stretchable bead regions for mounting the tire to a wheel;
(c) two sidewalls, each of said sidewalls comprising a first portion extending inwardly relative to a width of the tire from one of said bead regions to a deflection region and a second portion extending outwardly relative to the width of the tire from said deflection region to a corresponding one of said shoulder regions;
(d) a substantially non-stretchable girth-limiting configuration associated with said first portion of each of said sidewalls, encircling said tire axis and located inwardly relative to a width of the tire from said bead regions, said substantially non-stretchable girth-limiting configuration comprising an arrangement of at least one thread associated with said first portion of each of said sidewalls; and
(e) a radial reinforcing structure including a plurality of radially-extending reinforcing elements associated with said first portion of each of said sidewalls and configured to limit radial flexing of said first portion of said sidewall,
wherein said girth-limiting configuration and said radial reinforcing structure are configured such that, when the pneumatic tire is mounted on a wheel and inflated, said girth-limiting configuration limits a total circumference of a region of said first portion located inwardly relative to a width of the tire from said bead regions, thereby preventing outwards inversion of said first portion of each of said sidewalls so as to maintain an annular concavity between said bead region and said shoulder region.

2. The pneumatic tire of claim 1, wherein said at least one thread is integrated into said sidewall.

3. The pneumatic tire of claim 1, wherein said radially-extending reinforcing elements are integrated into said sidewall.

4. The pneumatic tire of claim 1, wherein said radially-extending reinforcing elements are implemented as a plurality of layers of radially aligned steel wires fixed in a rubber matrix.

5. The pneumatic tire of claim 1, wherein said radially-extending reinforcing elements are implemented as external reinforcing elements deployed in contact with an external surface of said first portion of said sidewall.

6. The pneumatic tire of claim 5, wherein said at least one thread of said girth-limiting configuration is implemented as a circumferential flex belt integrated with said external reinforcing elements.

7. The pneumatic tire of claim 1, wherein at least part of an area of said second portion of said sidewall has a flexible wall structure.

8. The pneumatic tire of claim 1, wherein a majority of an area of said second portion of said sidewall has a flexible wall structure that changes curvature to accommodate variations in distance of said tread from said bead region.

9. The pneumatic tire of claim 1, wherein at least part of an area of said second portion of said sidewall comprises diagonal plies including threads oriented at oblique angles to a radial direction.

10. The pneumatic tire of claim 1, wherein a majority of an area of said second portion of said sidewall comprises diagonal plies including threads oriented at oblique angles to a radial direction.

* * * * *